(12) United States Patent
Miyake et al.

(10) Patent No.: US 8,139,240 B2
(45) Date of Patent: Mar. 20, 2012

(54) IMAGE FORMING APPARATUS

(75) Inventors: Kouji Miyake, Yamatokoriyama (JP); Shuhji Fujii, Kizugawa (JP); Kazuhiko Ido, Soraku-gun (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 455 days.

(21) Appl. No.: 12/380,561

(22) Filed: Feb. 27, 2009

(65) Prior Publication Data

US 2009/0225357 A1  Sep. 10, 2009

(30) Foreign Application Priority Data

Mar. 7, 2008  (JP) ................ P2008-058011

(51) Int. Cl.
*G06F 3/12* (2006.01)
(52) U.S. Cl. .............. 358/1.14; 358/1.13; 358/1.15; 358/1.16
(58) Field of Classification Search ............ 399/70, 399/79, 88; 358/1.12–1.16
See application file for complete search history.

(56) References Cited

U.S. PATENT DOCUMENTS

| | | | |
|---|---|---|---|
| 6,738,157 B1 | 5/2004 | Hirose | |
| 6,750,878 B1 | 6/2004 | Tatsuo et al. | |
| 6,978,284 B2 | 12/2005 | McBrearty et al. | |
| 2002/0033960 A1 | 3/2002 | Kazami | |
| 2003/0072582 A1* | 4/2003 | Oyaide | 399/70 |
| 2004/0078724 A1 | 4/2004 | Keller et al. | |
| 2004/0139385 A1* | 7/2004 | Sakaue | 715/500 |
| 2005/0012776 A1* | 1/2005 | Kato et al. | 347/23 |
| 2005/0237569 A1* | 10/2005 | Takahashi | 358/1.15 |
| 2005/0248807 A1 | 11/2005 | Kuroyanagi | |
| 2006/0007469 A1 | 1/2006 | Uruma | |
| 2006/0018628 A1 | 1/2006 | Mizuno et al. | |
| 2006/0045544 A1 | 3/2006 | Kim et al. | |
| 2007/0220359 A1 | 9/2007 | Mochizuki | |
| 2008/0007486 A1 | 1/2008 | Fujinawa et al. | |
| 2008/0089709 A1* | 4/2008 | Higashi | 399/79 |
| 2008/0144070 A1 | 6/2008 | Mori et al. | |
| 2008/0183762 A1* | 7/2008 | Komamura | 707/200 |
| 2008/0260416 A1* | 10/2008 | Nosaki | 399/88 |
| 2009/0251416 A1* | 10/2009 | Fujii et al. | 345/168 |

FOREIGN PATENT DOCUMENTS

| | | |
|---|---|---|
| CN | 101030069 A | 9/2007 |
| JP | 6-261166 A | 9/1994 |
| JP | 2001-016388 A | 1/2001 |
| JP | 2001-18501 A | 1/2001 |
| JP | 2002-111940 A | 4/2002 |
| JP | 2003-110763 | 4/2003 |
| JP | 2003-209718 A | 7/2003 |
| JP | 2006-20263 | 1/2006 |
| JP | 2006-021501 A | 1/2006 |
| JP | 2006-139145 A | 6/2006 |
| JP | 2006-201460 A | 8/2006 |
| JP | 2006-208536 A | 8/2006 |
| JP | 2007-331121 | 12/2007 |

* cited by examiner

*Primary Examiner* — Chan Park
(74) *Attorney, Agent, or Firm* — Edwards Wildman Palmer LLP; David G. Conlin; David A. Tucker

(57) ABSTRACT

An image forming apparatus is provided, in which communication history that may change in a sleep mode is updated and displayed, whereby state of data communication in the sleep mode can be grasped. Even if the image forming apparatus as a whole is stopped, power is supplied only to a communication unit. When data is transmitted/received from an external device, a communication controller of the communication unit that transmitted/received data temporarily drives an electronic paper, so that transmission/reception log is displayed on electronic paper. Thereafter, power supply to the electronic paper is stopped.

10 Claims, 13 Drawing Sheets

IMAGE FORMING APPARATUS

CROSS-REFERENCE TO RELATED APPLICATION

This nonprovisional application claims priority under 35 U.S.C. §119(a) on Patent Application No. 2008-058011 filed in Japan on Mar. 7, 2008, the entire contents of which are hereby incorporated by reference.

BACKGROUND OF THE INVENTION

1. Field of the Invention

The present invention relates to an image forming apparatus such as a multifunctional printer, having a function of communicating with an external device.

2. Description of the Background Art

Electronic paper is a thin display technology similar to a liquid crystal display and the like, and it has similar appearance as ordinary paper. The electronic paper is characterized in that displayed contents are electrically rewritable, and that power consumption thereof is very low as electric power is unnecessary to retain the displayed contents. In addition, electronic paper is non-volatile, that is, once the displayed contents are rewritten, the displayed contents are maintained even when power is turned off. Attempts to apply electronic paper as such have been made in various technical fields.

By way of example, Japanese Patent Laying-Open No. 2003-209718 (Document 1) proposes a technique of utilizing electronic paper in a digital camera. According to the technique disclosed in Document 1, when a power button is pressed by a user while the power is on, remaining battery level is calculated, and the maximum number of pictures that can be taken is calculated from available memory space. These pieces of calculated information are output to electronic paper, and on the electronic paper, information related to the remaining battery level and the maximum number of pictures that can be taken at present is displayed. Even when the power of digital camera is turned off thereafter, the displayed contents of information related to the remaining battery level and the maximum number of pictures that can be taken before power-off are maintained.

Further, Japanese Patent Laying-Open No. 2006-201460 (Document 2) proposes a technique of utilizing electronic paper in an image forming apparatus such as a multifunctional printer. According to the technique disclosed in Document 2, information related to image formation, such as counter information and information of supplies, is displayed on electronic paper. This allows collection of necessary pieces of information without turning on the power.

SUMMARY OF THE INVENTION

In consideration of global environment including global warming, various types of recent devices that make transition to sleep mode to limit power consumption come to be heavily marketed. Such trend is also felt in the field of image forming apparatuses including multifunctional peripherals having the function of communicating with external devices.

In designing an image forming apparatus, a problem to be solved is to provide updated display of communication history that may change in a sleep mode when power supply to the apparatus is shut-off, so as to enable the user to grasp the state of communication in the sleep mode.

Though it is possible by the techniques described in Documents 1 and 2 to transmit necessary information to the user or service person even when power is off by displaying information before power off on the electronic paper, the idea described above cannot be realized. Specifically, in order to solve such a problem, the techniques described in Documents 1 and 2 cannot directly be adopted.

The present invention was made in view of the foregoing, and its object is to provide an image forming apparatus in which communication history that may change in the sleep mode is displayed, so that state of data communication can be grasped in the sleep mode.

In order to attain the above-described object, the present invention provides an image forming apparatus, including: a power conduction control circuit controlling partial power conduction of the apparatus; a first display unit displaying state of the apparatus when power is supplied to the apparatus by the power conduction control circuit; a second display unit maintaining displayed contents when power is not supplied to the apparatus by the power conduction control circuit; and a communication unit transmitting/receiving data to/from an external device; wherein the communication unit includes an updating unit allowing data transmission/reception when power is supplied thereto while power is not supplied to the apparatus by the power conduction control circuit, for updating contents displayed on the second display unit upon data transmission/reception.

In the arrangement above, even in the non-conduction state, the contents displayed on the first display unit are maintained at the second display unit. Therefore, even when the operation of image forming apparatus is suspended, display to the user can be continued. Therefore, assuming that the image forming apparatus as a whole is suspended and power is conducted only to the communication unit to transmit/receive data to/from an external device, the following operations are possible: the communication unit that has transmitted/received data temporarily drives the second display unit, a transmission/reception log is displayed on the second display unit, and then power conduction to the second display unit is shut off, whereby the state of data transmission/reception of the suspended image forming apparatus can be grasped and, in addition, wasteful power conduction can be prevented and power consumption can be reduced.

In the image forming apparatus above, the communication unit includes at least one of a modem and an NIC (Network Interface Card).

The arrangement above includes a communication unit for data transmission/reception to/from an external device while power is not supplied to the apparatus at midnight or at a set time period. Therefore, it is possible to confirm importance of received data by checking outline (for example, transmission source information) of the transmitted/received data while power is not supplied to the image forming apparatus. Thus, wasteful power conduction can be prevented and power consumption can be reduced.

In the image forming apparatus above, the second display unit is a non-volatile display device.

In the arrangement above, even when the second display unit is in the non-conduction state, the contents displayed thereon can be retained. Therefore, it is possible to continue display for the user even while the image forming apparatus is suspended, and necessary message can be given to the user without wasting power.

An example of the "non-volatile display device" may include electronic paper.

In the image forming apparatus, the second display unit displays a transmission/reception log.

In the arrangement above, log information of data communication that took place with the external device at midnight and at set time period can constantly be displayed while the apparatus is in non-conduction state. Therefore, it is possible to confirm outline (for example, transmission source information) of the received data without supplying wasteful power, and to confirm importance of the received data. Thus, wasteful power conduction can be prevented and power consumption can be reduced.

According to an aspect, the transmission/reception log is displayed in time sequential manner on the second display unit. This allows easy confirmation of log information.

Further, according to an aspect, the transmission/reception log is displayed in a manner allowing identification of manner of transmission/reception, by the second display unit. This allows easy identification of important received data such as a facsimile communication.

In the image forming apparatus above, the second display unit also serves as the first display unit.

The arrangement above enables display both at the time of power conduction and at the time of non-conduction without increasing cost of the apparatus, and it is unnecessary for the user to see a plurality of displays. Therefore, interface with the user is not degraded.

According to an aspect, the second display unit displays contents in an enhanced manner to better appeal to the user.

Here, it is possible for the user, by simply taking one look at the contents displayed on the second display unit, to recognize which state the apparatus is in.

Exemplary manner of "emphasized display" may include enlarged or highlighted display of "data communication type", "contents of transmission result (complete/failed)" and the like.

Further, according to an aspect, the transmission/reception log displays, when there are a plurality of communication histories, the histories starting from the latest one.

Here, it is possible for the user to confirm pieces of communication history information, starting from the latest one.

Further, according to an aspect, the transmission/reception log displays, when there are a plurality of communication histories, the histories starting from one having the highest importance.

Here, it is possible for the user to confirm pieces of communication information, starting from one having the highest importance.

As to the manner of "displaying history from one having highest importance", exemplary manner may include display of only the important results, such as "confidential reception", "data reception" and "transmission failure".

According to the present invention, it is possible to update and display communication history that may change in the sleep mode and, therefore, it is possible to let the user understand the state of communication in the sleep mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the appended figures.

<Overall Configuration of Image Forming Apparatus 20>

Figure 1:
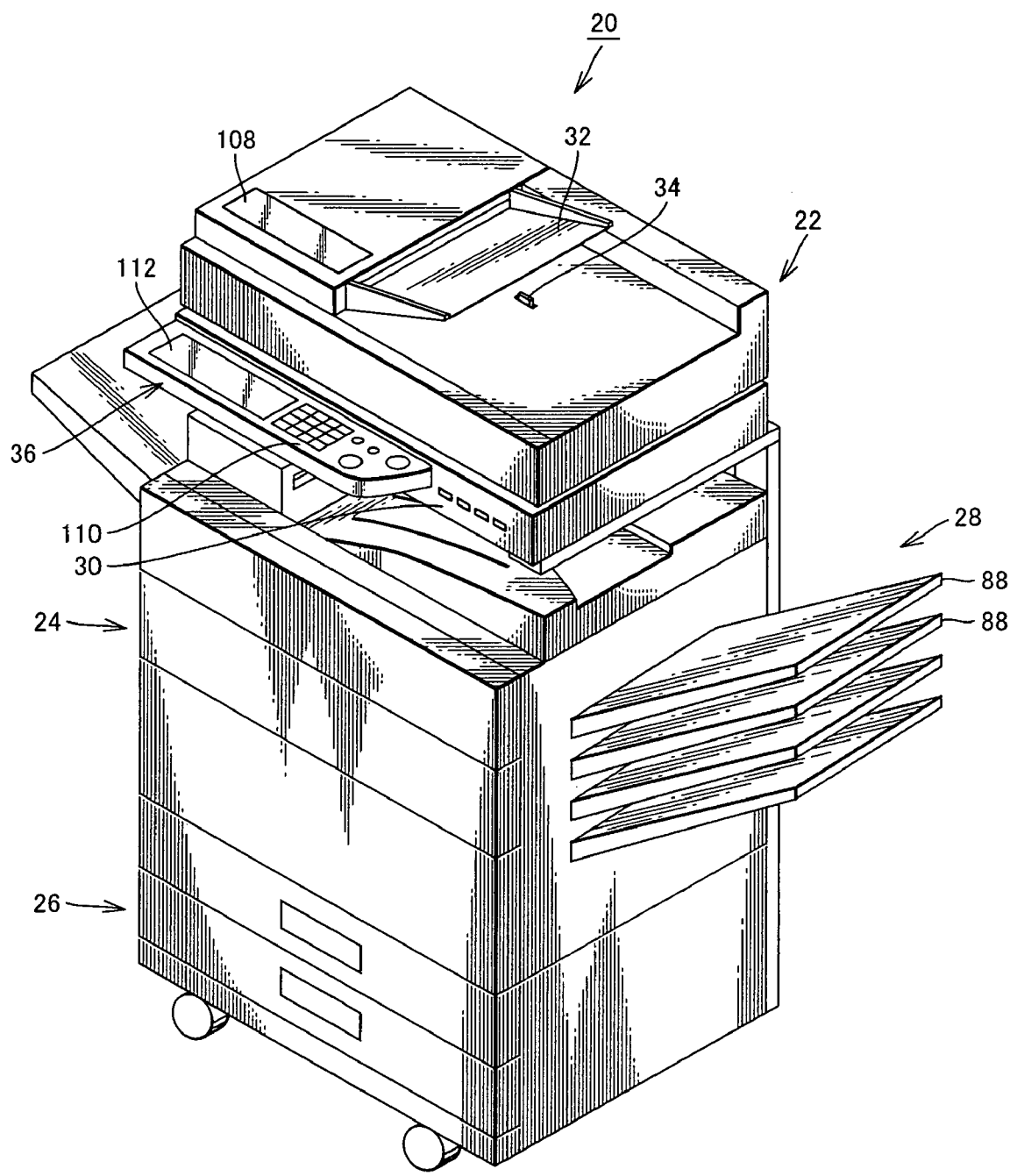
FIG. 1 is a perspective view showing an outer appearance of an image forming apparatus in accordance with an embodiment of the present invention.
Figure 2:
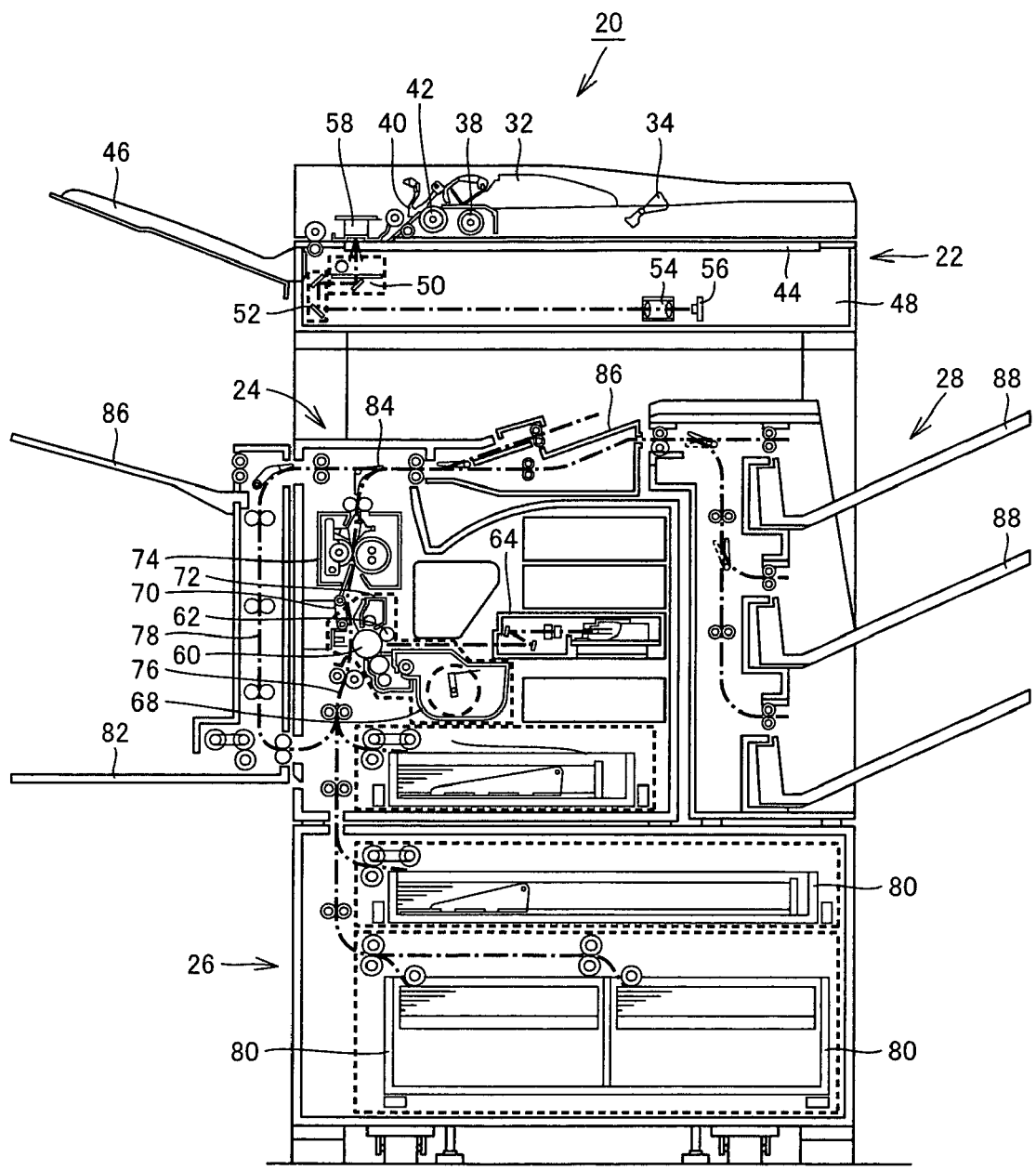
FIG. 2 schematically shows an internal configuration of the image forming apparatus.

FIG. 1 is a perspective view showing an appearance of an image forming apparatus 20 in accordance with the embodiment of the present invention, and FIG. 2 schematically shows an internal configuration of image forming apparatus 20.

Referring to FIGS. 1 and 2, an image forming apparatus 20 in accordance with the present embodiment is a digital multifunctional printer, and it is capable of operating selectively in, for example, a copy mode in which an image of a document is read and printed on a sheet of printing paper, a facsimile mode in which an image of a document is read and transmitted and an image of a document is received and printed on a sheet of printing paper, and a printer mode in which an image received through a network from an information terminal, not shown, is printed on a sheet of printing paper.

Image forming apparatus 20 includes a document feeding and reading unit 22, an image forming unit 24, a paper feeding unit 26, a post processing device 28, and a USB (Universal Serial Bus) interface 30.

Internal configuration of image forming apparatus 20 will be described taking an operation in the copy mode as an example.

When a document is set on a document set tray 32 of document feeding and reading unit 22 of image forming apparatus 20, first, a document detection sensor 34 detects that the document has been set. Operating unit 36 of document feeding and reading unit 22 is operated to input and set size of printing paper, magnification and the like. Thereafter, an instruction to start copying is given in accordance with the contents of operation on operating unit 36.

In response to an operation of operating unit 36, document feeding and reading unit 22 draws the document on document set tray 32 one by one, by pick-up roller 38, and feeds the drawn document to a platen glass 44 through a separation plate 40 and a feed roller 42, feeds the document in a sub-scanning direction on platen glass 44, and discharges the document to a document discharge tray 46.

At this time, a surface (lower surface) of the document is read by a first reading unit 48. Specifically, the first reading unit 48 first moves and positions a first scanning unit 50 to a prescribed position, and positions a second scanning unit 52 at a prescribed position. The document surface is irradiated through platen glass 44 with an exposure lamp of first scanning unit 50, and light reflected from the document is directed to an imaging lens 54 through reflection mirrors of first and second scanning units 50 and 52. The light reflected from the document is collected by imaging lens 54 to a CCD (Charge Coupled Device) 56, and the image on the document surface is formed on CCD 56, whereby the image on the document surface is read.

Further, a rear surface (upper surface) of the document is read by the second reading unit 58. The second reading unit 58 is arranged above platen glass 44. The second reading unit 58 includes an exposure lamp, formed of an LED (Light Emitting Diode) array, a fluorescent lamp and the like, irradiating the rear surface of document, a SELFOC (registered trademark) lens array collecting light reflected from the document pixel by pixel, and a contact image sensor (CIS) performing photo-electric conversion of the light reflected from the document received through SELFOC lens array and outputting an analog image signal.

Further, it is possible to open an upper part of document feeding unit 22 and to place a document on platen glass 44, and to read the document surface in this state by the first reading unit 48. In this case, the first and second scanning units 50 and 52 are moved in the sub-scanning direction while maintaining a prescribed speed relation to each other, whereby the document on platen glass 44 is exposed by the first scanning unit 50 and the light reflected from the document is guided by the first and second scanning units 50 and 52 to imaging lens 54. The document image is formed on CCD 56 by the imaging lens 54.

Figure 3:
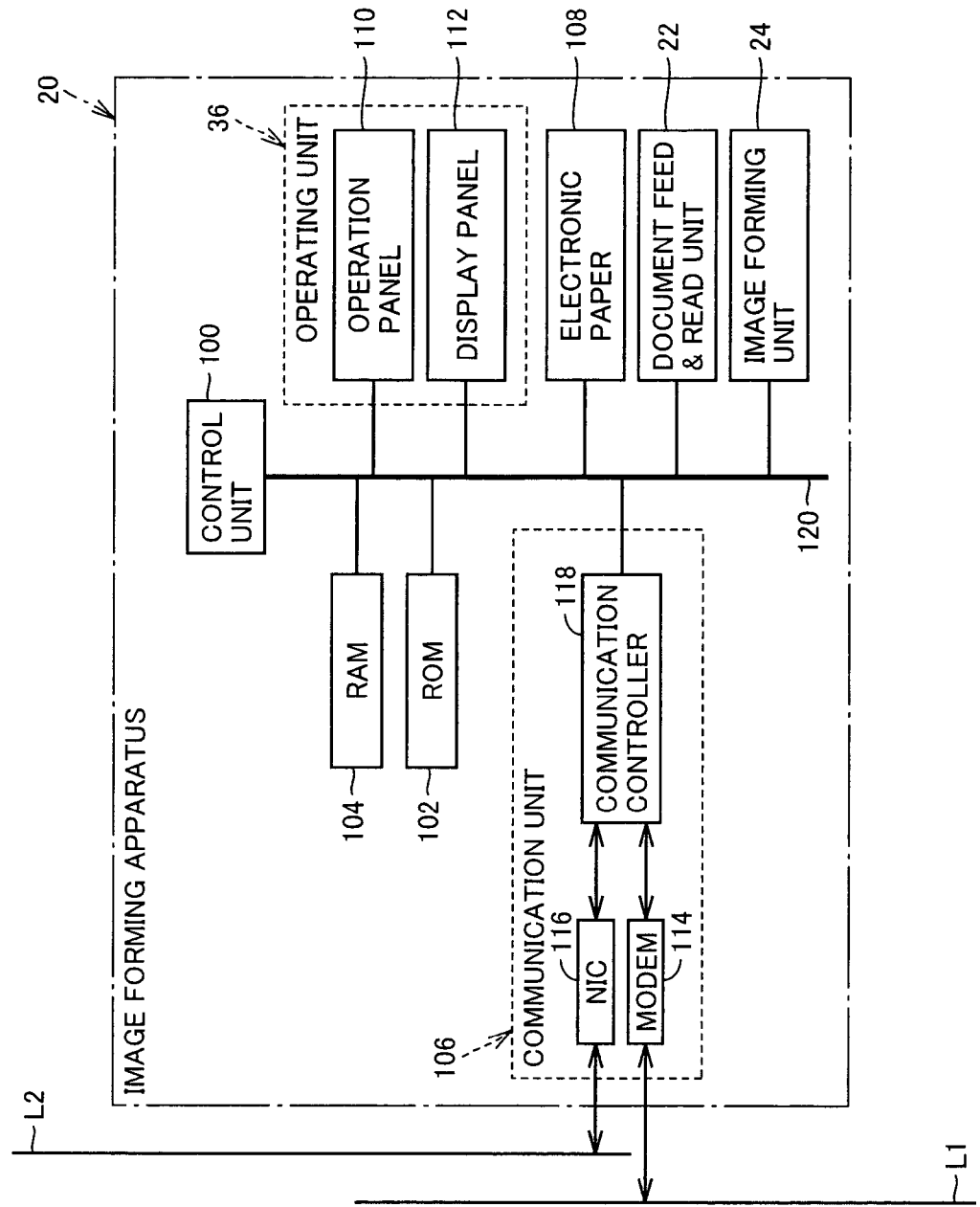
FIG. 3 is a block diagram showing hardware configuration of the image forming apparatus.

When one or both surfaces of the document are read in the above-described manner, image data representing the image or images on one or both surfaces of the document is input to a control unit 100 implemented, for example, by a microcomputer shown in FIG. 3, in which the image data is subjected to various types of image processing and output to image forming unit 24.

Image forming unit 24 prints the document image on a sheet of recording paper based on the image data, and it includes a photoreceptor drum 60, a charger 62, a laser scanning unit (hereinafter denoted as "LSU") 64, a developer 68, a transfer device 70, a cleaning device 72, a fixing device 74, a neutralizer, not shown, and the like.

Further, image forming unit 24 is provided with a main feeding path 76 and a reverse feeding path 78. A sheet of recording paper fed from paper feeding unit 26 is fed along main feeding path 76. Paper feeding unit 26 draws sheets of recording paper contained in paper cassette 80 or placed on a manual feed tray 82 one by one, and feeds the drawn sheet of recording paper to main feeding path 76 of image forming unit 24.

While the sheet of paper is fed along main feeding path 76 of image forming unit 24, that is, while the sheet of paper passes between photoreceptor drum 60 and transfer device 70 and further through fixing device 74, printing is done on the sheet of recording paper.

Photoreceptor drum 60 rotates in one direction, and its surface is cleaned by cleaning device 72 and the neutralizer, and then uniformly charged by charger 62.

LSU 64 modulates laser beam based on the image data output from document feeding and reading unit 22, and repeatedly scans the surface of photoreceptor drum 60 with the laser beam in the main scanning direction, whereby an electrostatic latent image is formed on the surface of photoreceptor drum 60.

Developer 68 develops the electrostatic latent image by supplying toner to the surface of photoreceptor drum 60, and forms a toner image on the surface of photoreceptor drum 60.

Transfer device 70 transfers the toner image on the surface of photoreceptor drum 60, to the sheet of recording paper passing through transfer device 70 and photoreceptor drum 60.

Fixing device 74 fixes the toner image on the sheet of recording paper, by applying heat and pressure to the sheet of recording paper.

At a connecting position between main feeding path 76 and reverse feeding path 78, a branching pawl 84 is provided. When printing is to be done only on one side of the sheet of recording paper, branching pawl 84 is positioned such that the sheet of recording paper fed from fixing device 74 is guided by branching pawl 84 to discharge tray 86 or to a post processing device 28.

When printing is to be done on both surfaces of the sheet of recording paper, branching pawl 84 is turned in a prescribed direction so that the sheet of recording paper is guided to reverse feeding path 78. The sheet of recording paper is turned over as it passes through reverse feeding path 78, and then it is again fed to the main feeding path 76 and, as the sheet of recording paper is again fed along the main feeding path 76, printing is done on the rear surface, and the sheet is guided to discharge tray 86 or post processing device 28.

The sheet of recording paper on which printing has been done as described above is guided to discharge tray 86 or post processing device 28, and discharged to discharge tray 86 or to any of discharge trays 88 of post processing device 28.

Post processing device 28 is for performing processes of sorting and discharging a plurality of sheets of recording paper to discharge trays 88, punching each sheet of recording paper, and stapling the sheets of paper. By way of example, when a number of printed copies are to be prepared, post processing device 28 sorts and discharges sheets of recording paper to discharge trays 88 such that sorted sets of copies are allotted one by one, and each set of sheets on each discharge tray 88 is punched or stapled, whereby printed copies are provided.

<Hardware Configuration of Image Forming Apparatus 20>

FIG. 3 is a block diagram showing a hardware configuration of image forming apparatus 20.

Referring to FIG. 3, image forming apparatus 20 includes document feeding and reading unit 22 capable of reading document image, image forming unit 24 providing printed output by forming an image read by document feeding and reading unit 22 on a sheet of paper with the image color reproduced by electro-photographic process, operating unit 36 allowing settings of various functions related to the image forming process as described above, and, in addition, a control unit 100, an ROM (Read Only Memory) 102, an RAM (Random Access Memory) 104, a communication unit 106 and an electronic paper 108.

Operating unit 36 includes an operation panel 110 and a display panel 112. Appearances of operation panel 110 and display panel 112 will be described later.

Control unit 100 is in charge of overall control of image forming apparatus 20, and it is implemented by a CPU (Central Processing Unit) or the like.

ROM 102 stores a program, data and the like necessary for controlling an operation of image forming apparatus 20. Control unit 100 controls image forming apparatus 20 in accordance with the program and data stored in the ROM, and executes control related to various functions of image forming apparatus 20.

RAM 104 has a function of a working memory temporarily storing results of operations and processes performed by control unit 100, a function of a back-up memory storing count value, jam and service error history information, information of supplies and the like and a function of a frame memory storing image data.

Communication unit 106 includes a modem 114, an NIC (Network Interface Card) 116 and a communication controller 118.

Modem 114 is connected to provide an interface with telephone line L1 connected to a facsimile device, not shown. NIC 116 is connected to provide an interface with an LAN (Local Area Network) line L2 connected to an information terminal such as a computer, not shown.

Communication controller 118 is implemented, for example, by a CPU, an ROM, an RAM and the like, and it controls operations of modem 114 and NIC 116.

Displaying operation of electronic paper 108 is realized by physically moving media particles by applying bias (electrophoresis). Even when there is a transition from normal operation mode to sleep mode and power conduction to electronic paper 108 is stopped, the moved particles (that went under electrophoresis) can retain their state and, as a result, the displayed contents are maintained. Specifically, electronic paper 108 is a non-volatile display member of which displayed contents can be kept continuously even after power conduction to display panel 112 is shut off, and it functions as an auxiliary display unit of display panel 112. Electronic paper 108 is attached to the top plate of document feeding and reading unit 22, as shown in FIG. 1.

Document feeding and reading unit 22, image forming unit 24, ROM 102, RAM 104, operation panel 110 and display panel 112 of operating unit 36, communication controller 118 of communication unit 106 and electronic paper 108 described above are connected to a bus 120 extending from control unit 100. Therefore, document feeding and reading unit 22, image forming unit 24, ROM 102, RAM 104, operation panel 110 and display panel 112 of operating unit 36, communication controller 118 of communication unit 106 and electronic paper 108 are controlled by control unit 100.

Control unit 100 performs power conduction control using a driving power source, not shown, on document feeding and reading unit 22, image forming unit 24, operating unit 36, communication unit 106 and electronic paper 108 described above, at the time of transition from normal operation mode to sleep mode in which power consumption is limited, and from sleep mode to normal operation mode.

Further, control unit 100 and communication controller 118 of communication unit 106 form display data based on data stored in RAM 104 and the like, respectively, and control electronic paper 108 such that the display data is displayed thereon.

Particularly, in the present embodiment, communication controller 118 described above is capable of data transmission/reception when power is supplied thereto, at the time when power is not supplied to image forming apparatus 20 under the control of control unit 100, and it is adapted such that at the completion of data transmission/reception, contents displayed on electronic paper 108 are updated.

<Appearance of Operating Unit 36>

Figure 4:
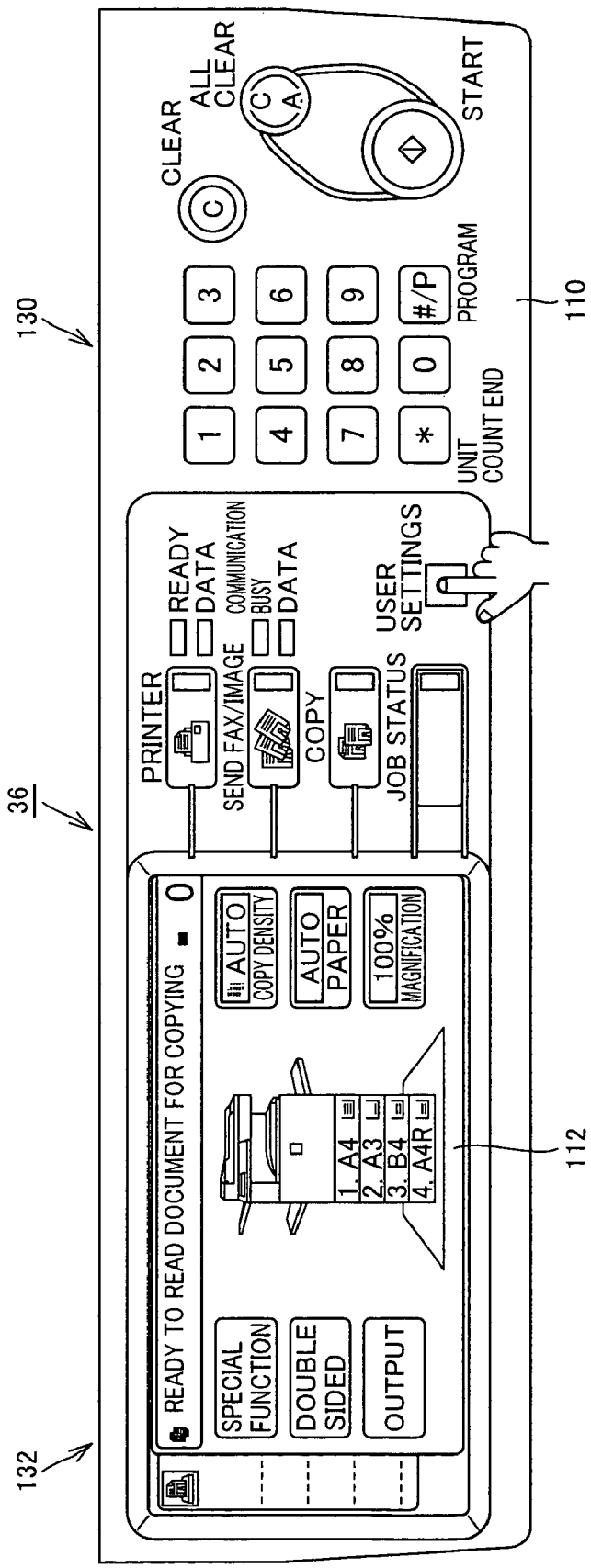
FIG. 4 is a plan view showing an appearance of an operating unit.

FIG. 4 is a plan view showing an appearance of operating unit 36.

Referring to FIG. 4, operating unit 36 is formed by integrating operation panel 110 and display panel 112. Operating unit 36 is divided into two areas 130 and 132.

Specifically, operation panel 110 is placed on the right area 130 of operating unit 36, and on which ten keys and various other operation buttons are provided. On the other hand, display panel 112 is arranged from the center to the left area 132 of operating unit 36, and it is formed of a small, touch-panel integrated type liquid crystal display.

It is possible to confirm the state of image forming apparatus 20, job processing status, and the like, from the display on display panel 112 of operating unit 36. Further, it is possible to set functions and to instruct an operation of image forming apparatus 20 and the like, by selecting, on the touch panel superposed on the display area, a select button displayed on the display area of liquid crystal display of display panel 112.

<Software Configuration>

The present embodiment is programmed such that data transmission/reception is possible when power is supplied to communication unit 106 while power is not conducted to image forming apparatus 20 under the control of control unit 100 described above, and that contents displayed on electronic paper 108 are updated at the completion of data transmission/reception.

The program is stored in an ROM of communication controller 118, which is substantially a computer, and realizes the function of image forming apparatus 20 described in the following. The function is realized by a CPU of communication controller 118 executing the above-described program.

In the transmission of transmission reservation data and in the data reception as will be described below, it is assumed that operation has been changed from the normal operation mode to the sleep mode (hereinafter also referred to as the "power saving mode"), because of the power conduction control function of control unit 100.

(Transmission of Transmission Reservation Data)

Figure 5:
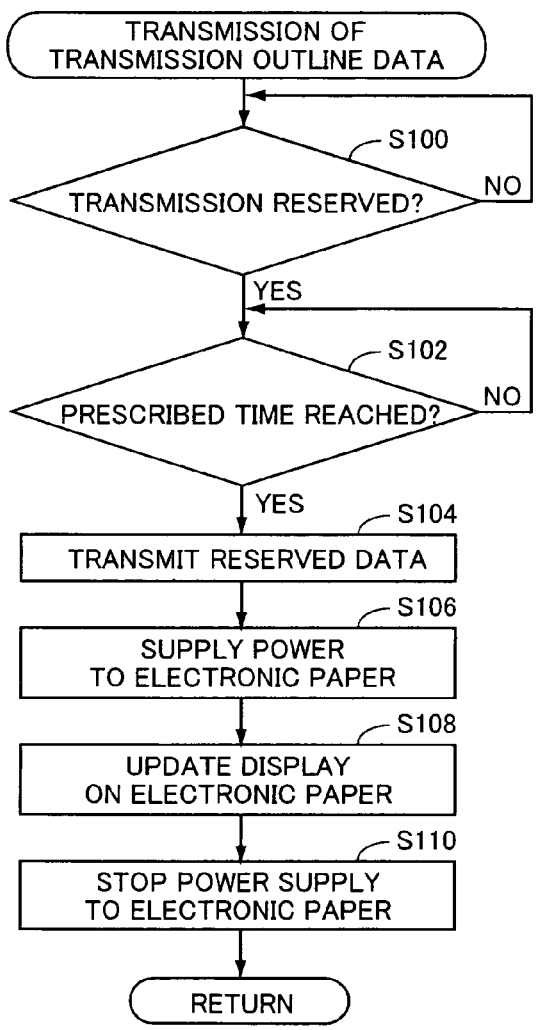
FIG. 5 shows, in the form of a flowchart, a program structure related to transmission of transmission summary data in the image forming apparatus.

FIG. 5 shows, in the form of a flowchart, a program structure related to transmission of transmission reservation data of image forming apparatus 20.

Referring to FIG. 5, for processing the transmission reservation data, communication controller 118 waits for an operation of transmission reservation through operating unit 36 (step S100).

If there is a transmission reservation, communication controller 118 waits until a prescribed time (step S102). If the prescribed time has reached, communication controller 118 transmits the reservation data (step S104). Specifically, communication controller 118 control modem 114 or NIC 116, and thereby transmits reserved data by electronic mail or facsimile.

Thereafter, communication controller 118 supplies power to electronic paper 108, to update display of transmission/reception history of electronic paper 108 (step S108).

When updating of the displayed contents of electronic paper 108 ends, communication controller 118 stops power supply to electronic paper 108 (step S110). Even when power conduction is stopped in this manner, electronic paper 108 continuously displays the transmission/reception history that was updated at step S108.

(Data Reception)

Figure 6:
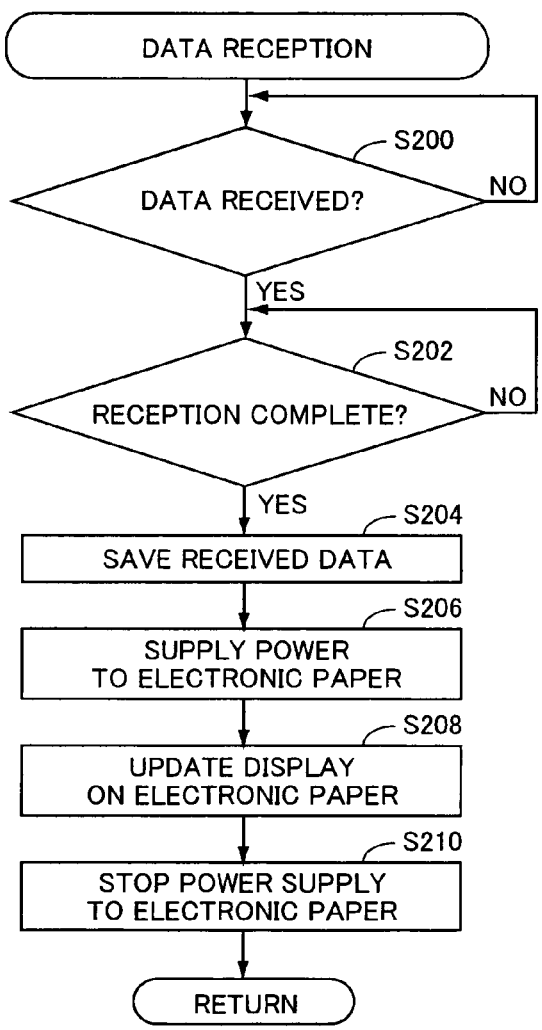
FIG. 6 shows, in the form of a flowchart, a program structure related to data transmission in the image forming apparatus.

FIG. 6 shows, in the form of a flowchart, a program structure related to data reception of image forming apparatus 20.

Referring to FIG. 6, for data reception, communication controller 118 waits for reception of data through modem 114 or NIC 116 (step S200).

If the data is received, communication controller 118 waits for completion of data reception (step S202). When data reception is complete, the received data is saved in RAM 104 (step S204).

Thereafter, communication controller 118 supplies power to electronic paper 108, to update display of transmission/reception history of electronic paper 108 (steps S206 and S208).

When updating of displayed contents of electronic paper 108 ends, communication controller 118 shuts off power supply to electronic paper 108 (step S210). Even when power supply is shut off, the display of transmission/reception history updated at step S208 mentioned above is continuously given on electronic paper 108.

<Operation>

FIGS. 7 to 10 illustrate exemplary transition of history information indicating state of transmission/reception and reservation status of facsimile and e-mail, displayed on the electronic paper 108 while the image forming apparatus 20 is in the power saving mode.

Figure 7:
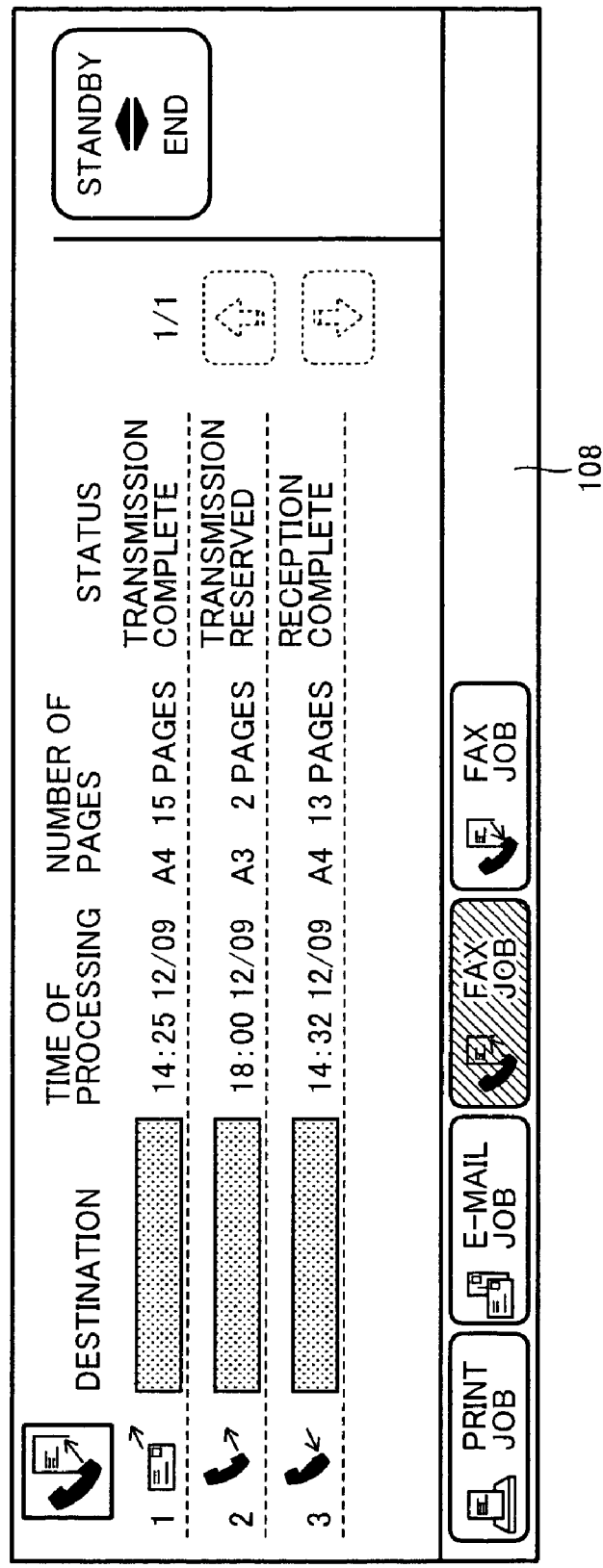
FIGS. 7 to 10 illustrate exemplary transition of history information indicating state of transmission/reception and reservation status of facsimile and e-mail, displayed on the electronic paper while the image forming apparatus is in the power saving mode.
Figure 8:
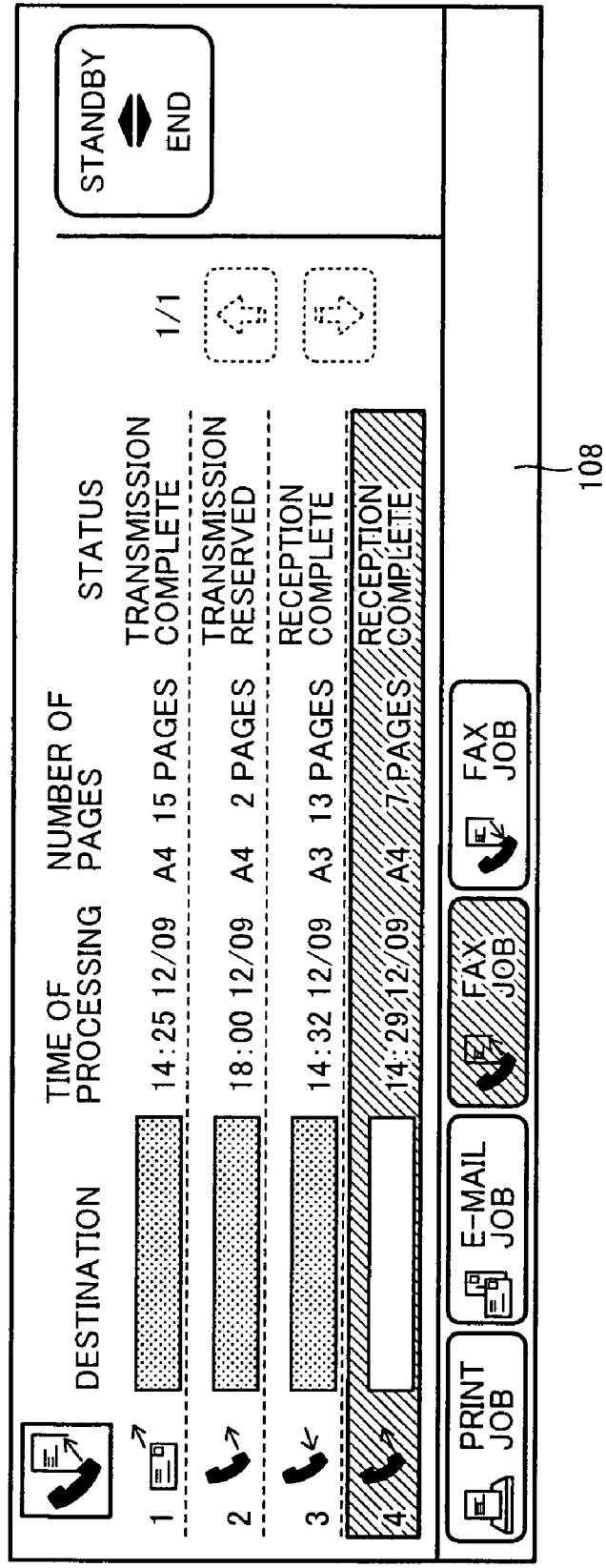
Figure 9:
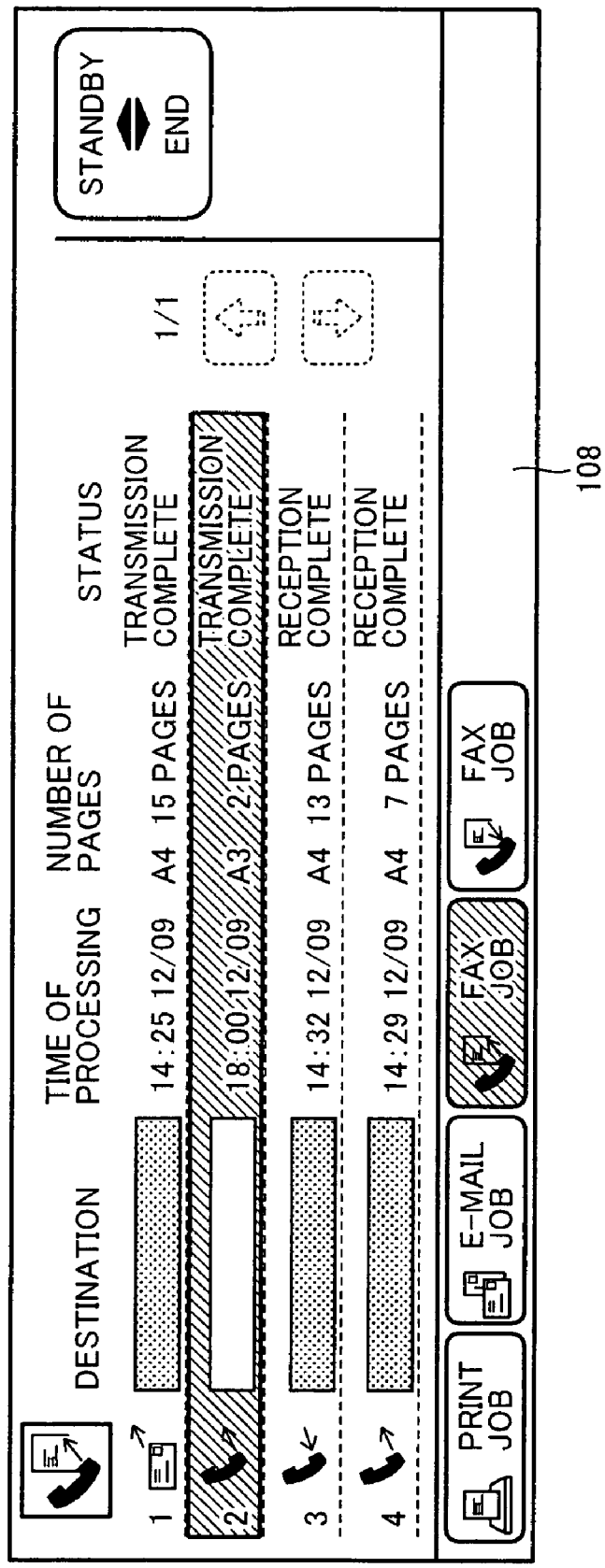

In the preset embodiment, when data is received from an external device or when transmission is completed at the reserved time at communication unit 106, communication controller 118 of communication unit 106 temporarily supplies power to electronic paper 108 so that change in reception job status or transmission job status is displayed on electronic paper 108 as shown in FIGS. 7 to 9, whereby the latest status of transmission/reception can be notified to the user. Further, on the image of communication job history information on electronic paper 108, a mark representing the latest communication job is highlighted, as shown by hatchings in FIGS. 7 to 10.

FIG. 8 shows a status that facsimile data has been received in the power saving mode of image forming apparatus 20. In the figure, the communication job history information of electronic paper 108 is updated by communication controller 118 of communication unit 106, such that information related to the reception data of "job No. 4" is added to the state of FIG. 7. At this time, the contents of communication job of "job No. 4" mentioned above are highlighted.

FIG. 9 shows a state in which transmission of facsimile data transmission reservation job is completed from the state of FIG. 8. In the figure, the communication job history information of "job No. 2" of FIG. 8 is updated from "transmission reservation" to "transmission complete". At this time, the contents of communication job of "job No. 2" mentioned above are highlighted.

Figure 10:
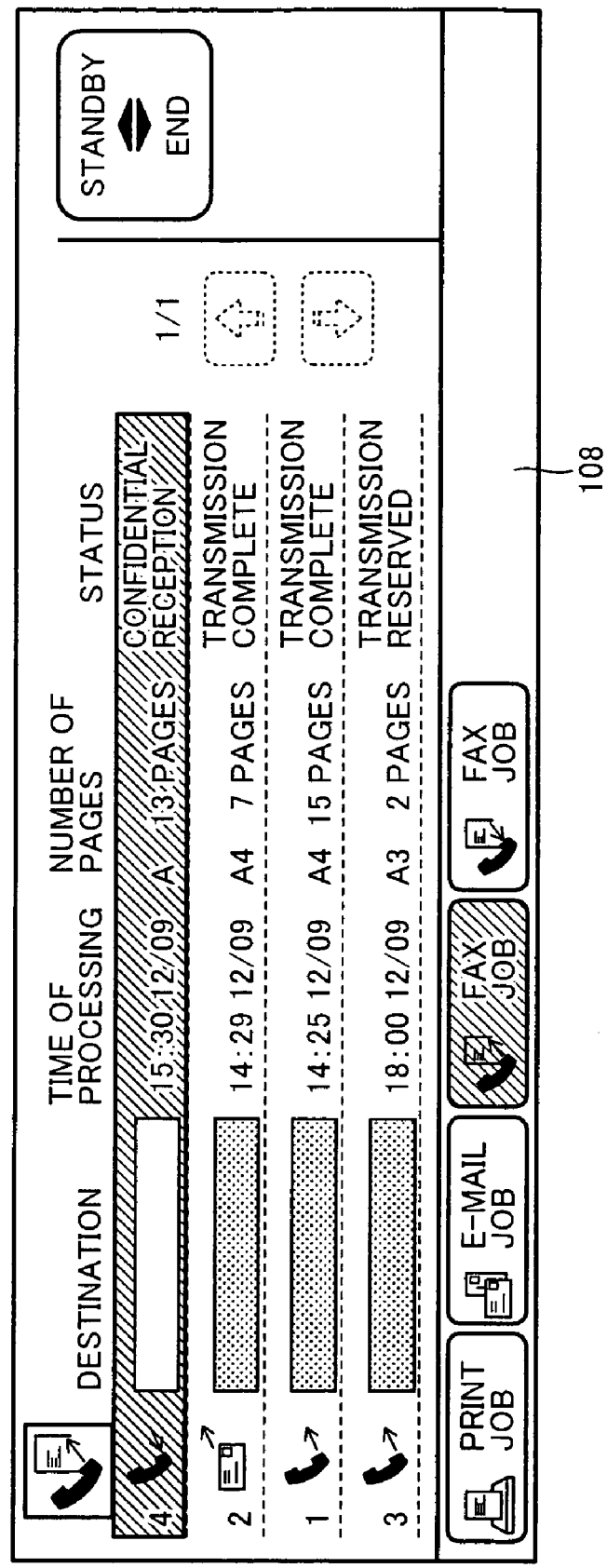

Further, FIG. 10 shows a state in which confidential facsimile data has been received in the power saving mode of image forming apparatus 20. In the figure, as "job No. 4" represents confidential reception of high importance, the contents of communication job of "job No. 4" mentioned above are highlighted.

After the contents displayed on electronic paper 108 are updated as described above, communication controller 118 of communication unit 106 shuts off power supply to electronic paper 108, so that wasteful power consumption can be reduced. At this time, as electronic paper 108 has non-volatile display characteristic, the contents displayed before power off can be maintained even after the power is shut off. Therefore, it is possible to constantly provide job status to the user.

Because of the operation described above, even if the image forming apparatus 20 is in the power saving mode and sleeping or power is not supplied, the communication function is operable and, therefore, facsimile reception, transmission reservation and the like at night is possible. When the set reservation status or the like set in image forming apparatus 20 is kept displayed, it becomes possible for the user to confirm the job reservation status, without the necessity of supplying power to image forming apparatus 20. Therefore, it is possible to prevent power supply for confirming job status, and hence, to prevent wasteful power consumption.

<Functions/Effects>

The present embodiment provides the following functions/effects.

(1) Electronic paper 108 maintains contents displayed on display panel 112 even in a state of non-conduction. Therefore, even when the operation of image forming apparatus 20 is suspended, display to the user can be continued. Therefore, assuming that operation of the image forming apparatus 20 as a whole is suspended and power is conducted only to the communication unit 106 to transmit/receive data to/from an external device, the following operations are possible: communication controller 118 of communication unit 106 that has transmitted/received data temporarily drives electronic paper 108, a transmission/reception log is displayed on the electronic paper 108, and then power conduction to electronic paper 108 is shut off, whereby the state of data transmission/reception of the suspended image forming apparatus 20 can be grasped and, in addition, wasteful power conduction can be prevented and power consumption can be reduced. In this manner, the communication history that may change in the sleep mode can be updated and displayed and, therefore, it is possible to have the user grasp the data communication state in the sleep mode and at the time of non-conduction.

(2) Communication unit 106 includes modem 114 and NIC 116, and performs data transmission/reception to/from an external apparatus when power is not supplied to image forming apparatus 20 at midnight or at a set time period. Therefore, it is possible to confirm importance of received data by checking outline (for example, transmission source information) of the transmitted/received data while power is not supplied to the image forming apparatus 20. Thus, wasteful power conduction can be prevented and power consumption can be reduced.

(3) Even when electronic paper 108 is in the non-conduction state, the contents displayed thereon can be retained. Therefore, it is possible to continue display for the user even while the image forming apparatus 20 is suspended, and necessary message can be given to the user without wasting power.

(4) On electronic paper 108, transmission/reception log is displayed. Therefore, by constantly displaying log information of data communication that took place with the external device at midnight and at set time period while the apparatus is in non-conduction state, it becomes possible to confirm outline (for example, transmission source information) of the received data without supplying wasteful power, and to confirm importance of the received data. Thus, wasteful power conduction can be prevented and power consumption can be reduced.

(5) The transmission/reception log is displayed in time sequence on electronic paper 108, and hence, log information can easily be confirmed.

(6) The transmission/reception log is displayed on electronic paper 108 to enable identification of the manner of transmission/reception. Therefore, it is possible, for example, to easily identify important reception data such as a facsimile communication.

(7) As to the manner of display of electronic paper 108, it provides highlighted display of contents to better appeal to the user. Therefore, it is possible by simply looking at the contents displayed on the display portion of electronic paper 108, to recognize which state the apparatus is in.

The present invention is not limited to the embodiment above.

Figure 11:
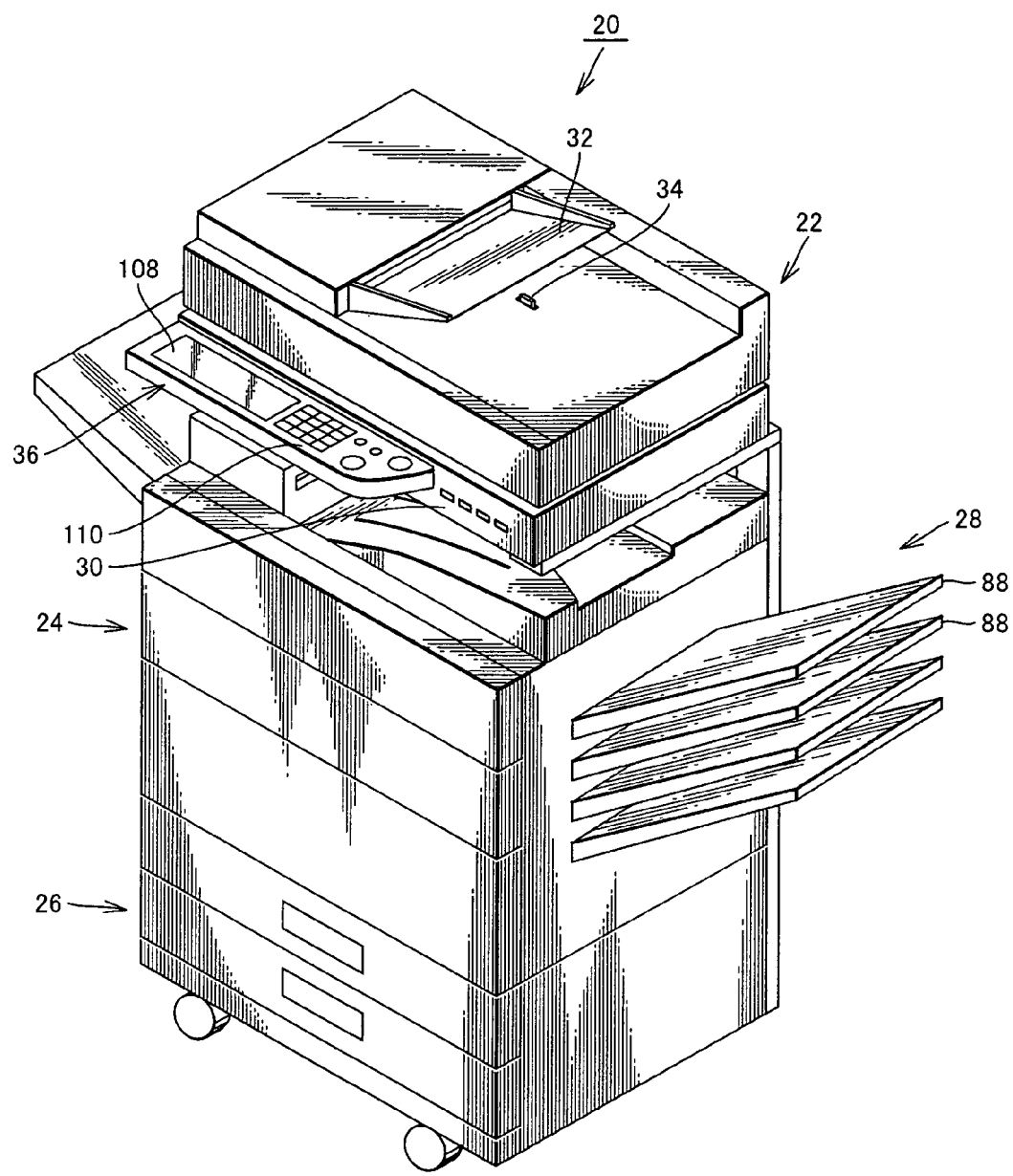
FIG. 11 is a perspective view showing an outer appearance of an image forming apparatus in accordance with a first modification of the present invention.
Figure 12:
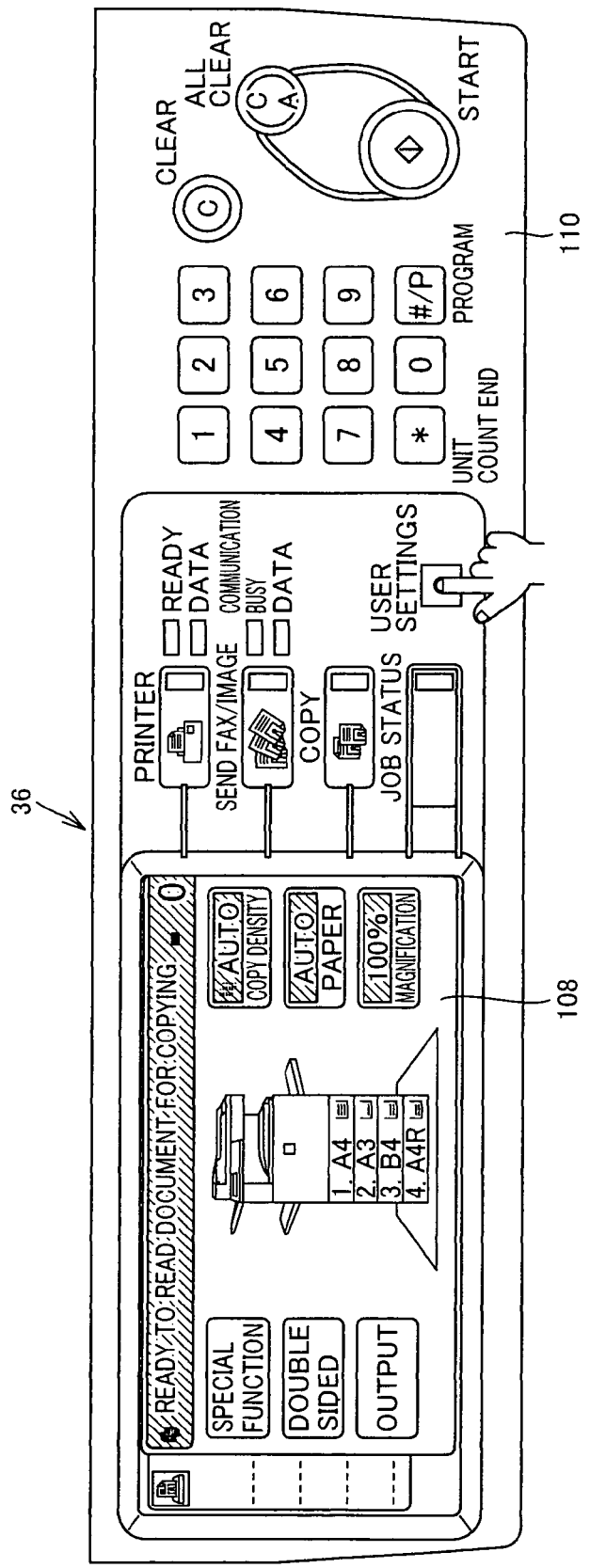
FIG. 12 is a plan view showing an appearance of an operating unit applied to the first modification.

For instance, in the embodiment above, an example has been described in which display panel 112 and electronic paper 108 are provided independent from each other. The present invention, however, is not limited to such a configuration. As shown in FIGS. 11 and 12, in place of display panel 112 of operating unit 36, electronic paper 108 may be provided, and electronic paper 108 may operate also as a display panel of operating unit 36. By this arrangement, display at the time of power conduction and at the time of non-conduction becomes possible without increasing cost of the apparatus, and it is unnecessary for the user to see a plurality of displays. Therefore, interface with the user is not degraded.

Figure 13:
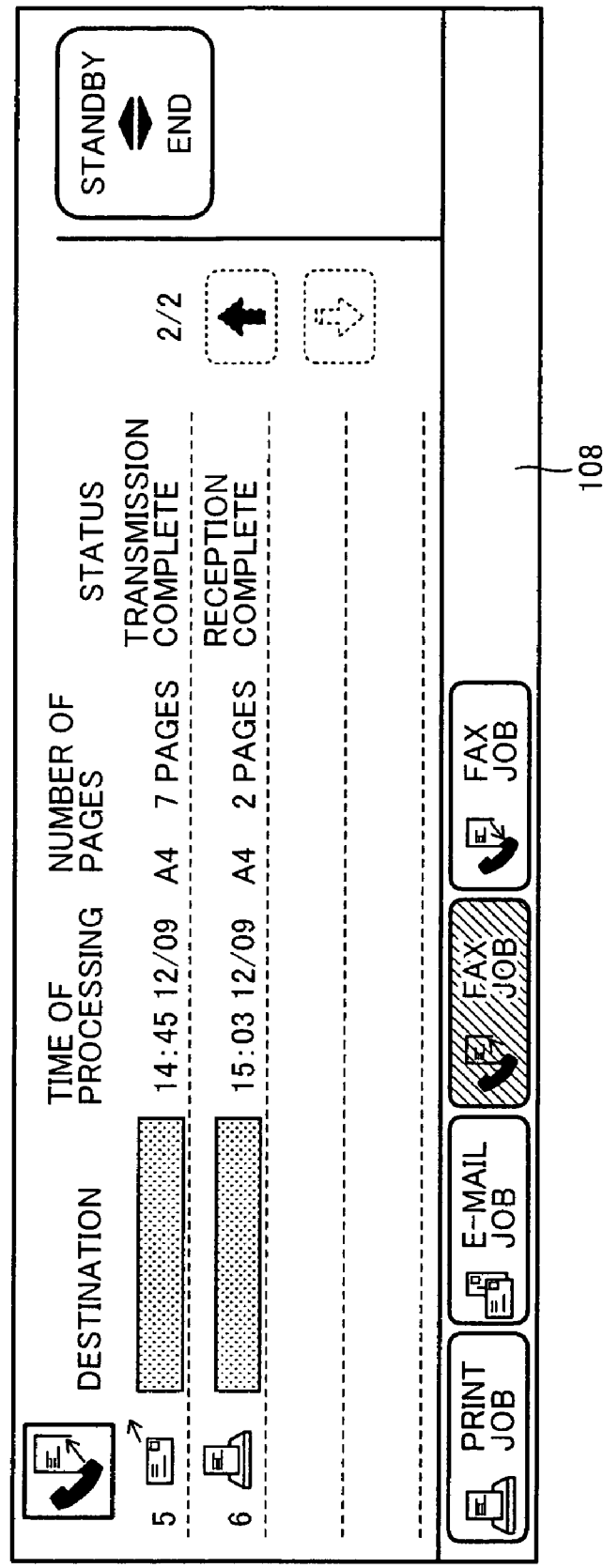
FIG. 13 illustrates history information indicating state of transmission/reception and reservation status of facsimile and e-mail, displayed on the electronic paper while the image forming apparatus in accordance with a second modification of the present invention is in the power saving mode.
Figure 14:
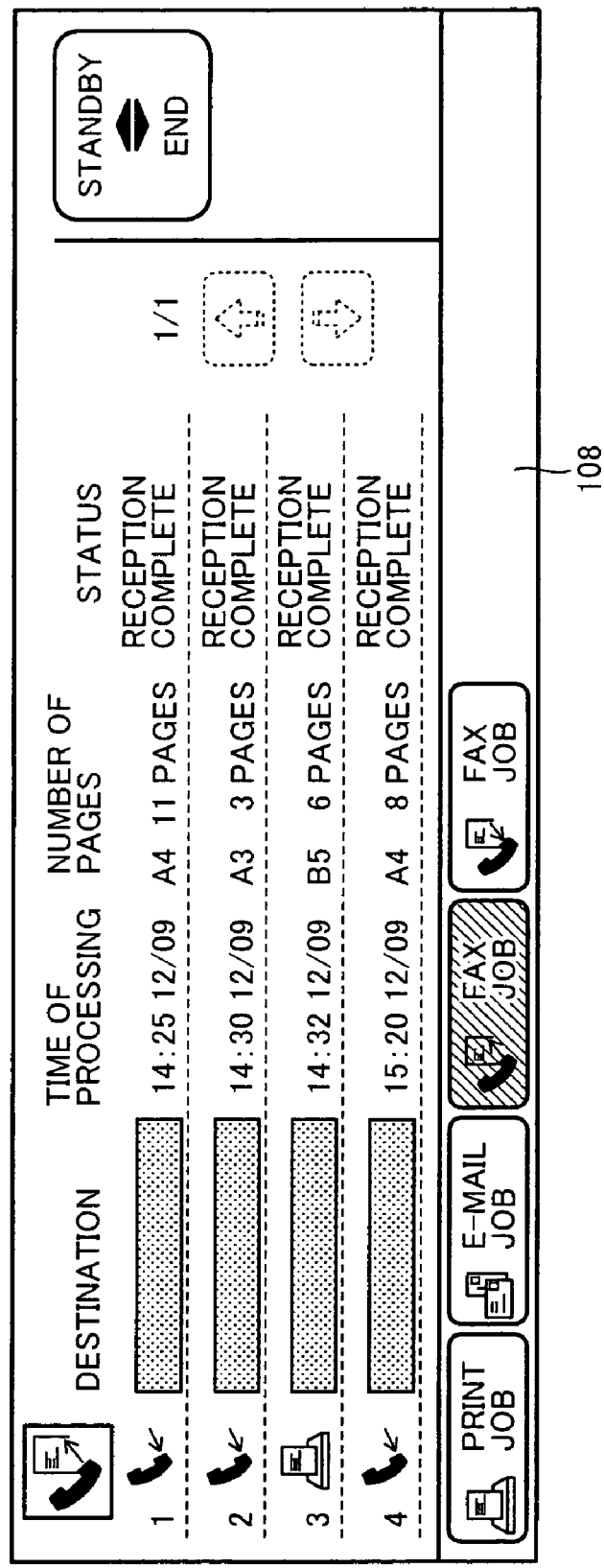
FIG. 14 illustrates history information indicating state of transmission/reception and reservation status of facsimile and e-mail, displayed on the electronic paper while the image forming apparatus in accordance with a third modification of the present invention is in the power saving mode.

Further, if there are a plurality of communication histories, they may be displayed on electronic paper 108 starting from the latest history as shown in FIG. 13, or they may be displayed on electronic paper 108 starting from the one having highest importance as shown in FIG. 14. By the former approach, it is possible for the user to confirm communication history information starting from the latest one, while by the latter approach, it is possible for the user to confirm communication information from the one having highest importance.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
   a power conduction control circuit controlling partial power conduction of the apparatus;
   a first display unit displaying state of the apparatus when power is supplied to the apparatus by said power conduction control circuit;
   a second display unit maintaining displayed contents when power is not supplied to the apparatus by said power conduction control circuit; and
   a communication unit transmitting/receiving data to/from an external device; wherein
   said communication unit includes an updating unit allowing data transmission/reception to/by said second display unit when power is supplied to said communication unit, and from said communication unit to said second display unit, while power is not supplied to the apparatus by said power conduction control circuit, for updating contents displayed on said second display unit upon said data transmission/reception.

2. The image forming apparatus according to claim 1, wherein
   said communication unit includes at least one of a modem and an NIC (Network Interface Card).

3. The image forming apparatus according to claim 1, wherein
   said second display unit is a non-volatile display device.

4. The image forming apparatus according to claim 1, wherein
   said second display unit displays a transmission/reception log.

5. The image forming apparatus according to claim 4, wherein
   said transmission/reception log is displayed in time sequential manner on said second display unit.

6. The image forming apparatus according to claim 4, wherein
   said transmission/reception log is displayed in a manner allowing identification of manner of transmission/reception, by said second display unit.

7. The image forming apparatus according to claim 4, wherein
   said transmission/reception log displays, when there are a plurality of communication histories, the histories starting from the latest one.

8. The image forming apparatus according to claim 4, wherein
   said transmission/reception log displays, when there are a plurality of communication histories, the histories starting from one having the highest importance.

9. The image forming apparatus according to claim 1, wherein
   said second display unit also serves as said first display unit.

10. The image forming apparatus according to claim 1, wherein
    said second display unit displays in a manner distinct from the appearance of the second display unit when powered in common with the image forming apparatus.

* * * * *